(12) United States Patent
Pohl et al.

(10) Patent No.: US 8,746,786 B2
(45) Date of Patent: Jun. 10, 2014

(54) SILL ARRANGEMENT OF A MOTOR VEHICLE BODY

(75) Inventors: Bernd Pohl, Muenster-Sarnsheim (DE); Roland Lessmeister, Otterberg (DE); Stefan Stanik, Bruchkoebel (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/274,757

(22) Filed: Oct. 17, 2011

(65) Prior Publication Data

US 2012/0091762 A1    Apr. 19, 2012

(30) Foreign Application Priority Data

Oct. 19, 2010 (DE) .......................... 10 2010 048 851

(51) Int. Cl.
*B62D 25/22* (2006.01)
(52) U.S. Cl.
USPC ........................................................ 296/209
(58) Field of Classification Search
CPC ............. B62D 25/025; B62D 25/2036; B62D 35/008; B60R 13/04; B60R 13/07
USPC ............ 296/209, 203.03, 30, 187.08, 187.12, 296/193.05, 193.07, 199; 52/716.5
See application file for complete search history.

(56) References Cited

U.S. PATENT DOCUMENTS

| | | | | |
|---|---|---|---|---|
| 2,833,589 | A | * | 5/1958 | Ahrens .......................... 49/484.1 |
| 3,132,891 | A | * | 5/1964 | Pyuro et al. ................... 296/204 |
| 4,911,495 | A | | 3/1990 | Haga et al. |
| 5,443,297 | A | * | 8/1995 | Tanaka et al. ............. 296/203.03 |
| 6,102,473 | A | * | 8/2000 | Steininger et al. ............. 296/209 |
| 6,409,257 | B1 | * | 6/2002 | Takashina et al. ............. 296/209 |
| 6,948,753 | B2 | * | 9/2005 | Yoshida et al. ............... 296/1.08 |
| 7,168,757 | B2 | * | 1/2007 | Futatsuhashi .................. 296/209 |
| 7,364,226 | B2 | * | 4/2008 | McNulty et al. ............... 296/209 |
| 2009/0167010 | A1 | * | 7/2009 | Rompage et al. ............. 280/847 |
| 2010/0078534 | A1 | * | 4/2010 | Yanagida et al. ........ 248/220.21 |

FOREIGN PATENT DOCUMENTS

| | | |
|---|---|---|
| DE | 3243756 A1 | 5/1984 |
| DE | 10304307 A1 | 8/2004 |
| DE | 102007052711 A1 | 5/2009 |
| DE | 102007063540 A1 | 7/2009 |
| GB | 2142594 A | 1/1985 |
| JP | 61109876 U | 7/1986 |
| JP | 2011031651 A * | 2/2011 |

(Continued)

OTHER PUBLICATIONS

German Patent Office, German Search Report for Application No. 102010048851.8, dated Jul. 7, 2011.

(Continued)

*Primary Examiner* — Jason S Morrow
*Assistant Examiner* — E Turner Hicks
(74) *Attorney, Agent, or Firm* — Ingrassia Fisher & Lorenz, P.C.

(57) ABSTRACT

A sill arrangement of a motor vehicle body is provided that has a sill outer plate, a sill inner plate, and a side wall outer plate, the sill inner plate and the sill outer plate being connected to one another with at least one flange extending essentially in the sill longitudinal direction, and the side wall outer plate fastened at least regionally on a lower side of the sill outer plate at a distance from the connecting flange.

9 Claims, 5 Drawing Sheets

(56) References Cited

FOREIGN PATENT DOCUMENTS

| KR | 100302741 B1 | 7/2001 |
|----|--------------|--------|
| KR | 20030034448 A | 5/2003 |
| KR | 20040039634 A | 5/2004 |

OTHER PUBLICATIONS

British Patent Office, British Search Report for Application No. 1115984.5, dated Jan. 5, 2012.

* cited by examiner

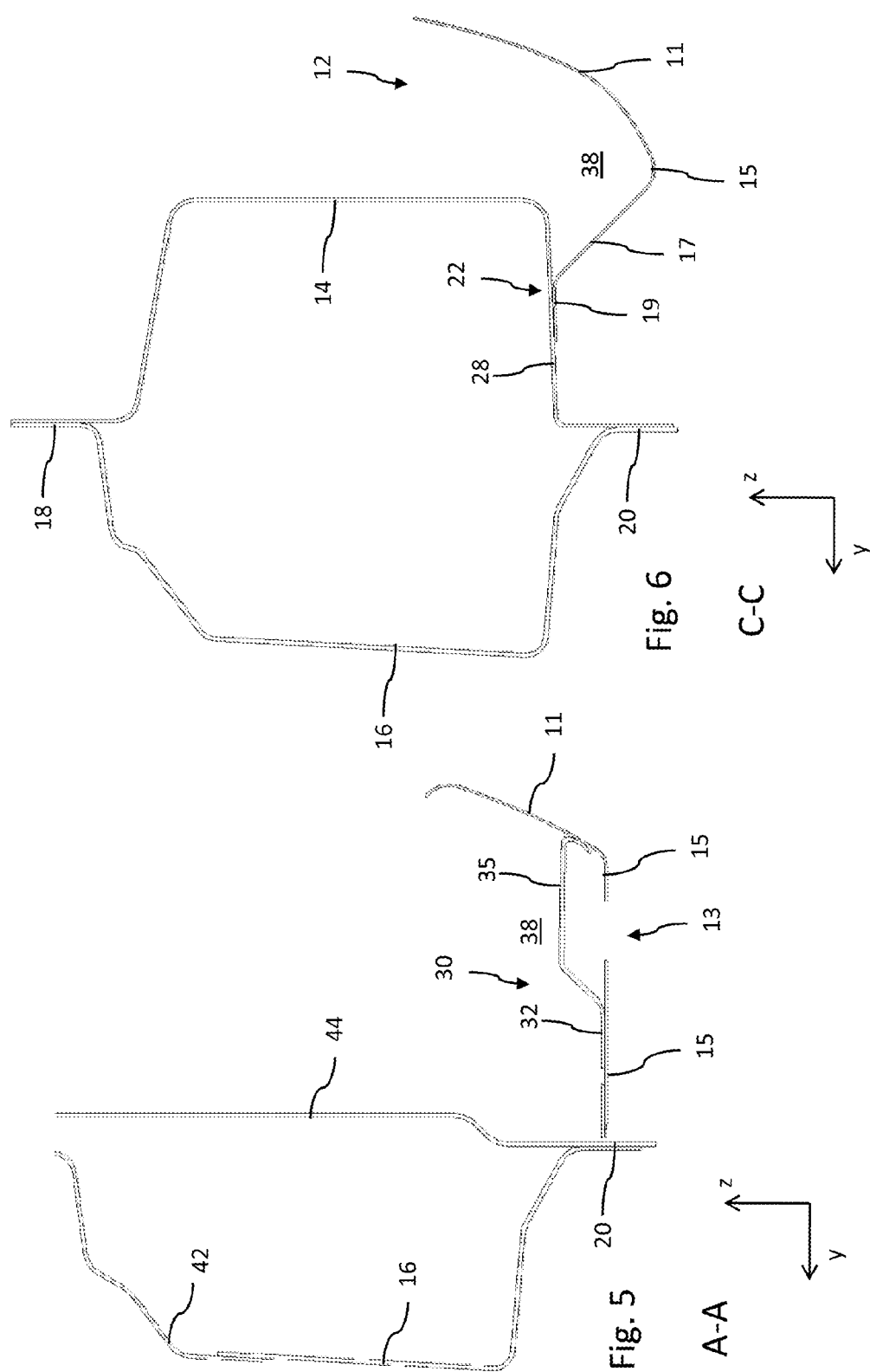

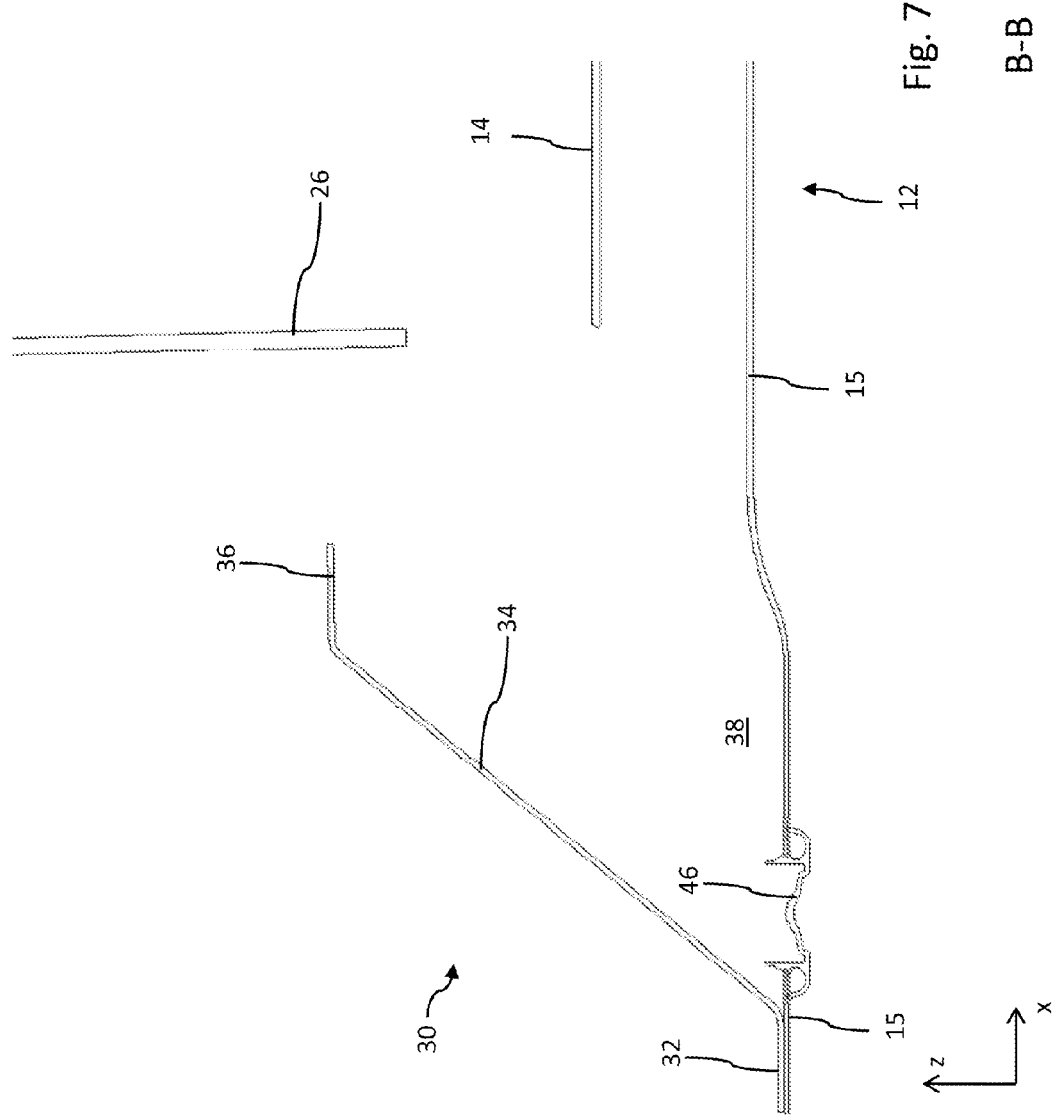

SILL ARRANGEMENT OF A MOTOR VEHICLE BODY

CROSS-REFERENCE TO RELATED APPLICATION

This application claims priority to German Patent Application No. 102010048851.8, filed Oct. 19, 2010, which is incorporated herein by reference in its entirety.

TECHNICAL FIELD

The technical field relates to a sill arrangement of a motor vehicle body, which has at least one sill outer plate, one sill inner plate, and one side wall outer plate, sill inner plate and sill outer plate being connected to one another by means of at least one connecting flange which extends in the sill longitudinal direction.

BACKGROUND

With respect to a desirable reduction of the fuel consumption and an accompanying minimization of the emission gases in operation of motor vehicles, it is desirable to continuously minimize the vehicle weight. In addition to the use of light construction materials, in particular a reduction of the size and number of parts of individual vehicle body components certainly comes into consideration in vehicle body construction for this purpose.

Thus, FIG. 1 and FIG. 2 show a sill arrangement 100 known in the prior art, in which, according to the cross-section in FIG. 2, a sill inner plate 106 forms, with a sill outer plate 104, a sill structure similar to a hollow profile, which is substantially covered or paneled on the outside by a side wall outer plate 102. Sill inner plate 106, sill outer plate 104, and also the side wall outer plate 102 are connected to one another in this case at a common joint 108, 110, formed in each case by a connecting flange of the participating parts, typically by means of welding.

The side wall outer plate 102, which functions as a paneling part, extends, viewed in the vehicle longitudinal direction (x), beyond the longitudinal end of the sill structure located behind it and has an essentially level floor section 112 extending essentially in the vehicle transverse direction (y) adjoining the joint 110. In the further manufacturing process of the motor vehicle body, this floor section 112, which is formed substantially without undercuts, serves as a receptacle for a terminus part 114, which has already been preinstalled on a further vehicle body module, for example, an assembly of a reinforcement ring provided for the vehicle door.

In the course of a modular assembly of reinforcement ring and a side wall structure having the sill structure, it is necessary to join the two prefinished vehicle body modules essentially in the vehicle transverse direction (y). In this case, the terminus part 114 provided with a lower fastening flange 116 is brought essentially in the vehicle transverse direction (y), i.e., from left to right in the view according to FIG. 2, along the inner side of the floor section 112 of the side wall outer plate 102 into a final installation position shown in FIG. 1, in which the terminus part can essentially close the hollow profile formed by sill inner plate 106, sill outer plate 104, and side wall outer plate 102.

At least one objection is to provide an improved sill arrangement, which allows a reduction of weight, material, and costs, and is implementable as much as possible without adapting the described joining and manufacturing methods. In addition, other objects, desirable features and characteristics will become apparent from the subsequent summary and detailed description, and the appended claims, taken in conjunction with the accompanying drawings and this background.

SUMMARY

The sill arrangement of a motor vehicle body provided here has a sill outer plate, a sill inner plate, and a side wall outer plate. The sill inner plate and the sill outer plate are connected to one another by means of at least one connecting flange extending essentially in the sill longitudinal direction. The mentioned sill plates are typically implemented as half-shells, which each have connecting flanges corresponding to one another, on which the two plates are mutually supported while forming a hollow profile and along which the plate parts are connected to one another, preferably welded.

At least one of the connecting flanges of sill outer plate and sill inner plate is not used in this case to attach and fasten the side wall outer plate. It is thus instead provided that the side wall outer plate is at least regionally fastened on a lower side of the sill outer plate at a distance from the connecting flange. In this way, the side wall outer plate can be implemented as significantly shortened in cross-section with savings of material and weight. This shortening requires, in comparison to the prior art, a fastening of the side wall outer plate on the sill outer plate to be provided above the lower connecting flange. The externally visible area of the side wall outer plate is to be implemented as nearly unchanged in this case in comparison to the prior art, to meet predefined requirements of motor vehicle design.

In an embodiment it is provided in particular for this purpose that the side wall outer plate at least sectionally has a floor section, which comes to rest at a predefined distance from the lower side of the sill outer plate in relation to the vehicle vertical direction (z). The floor section of the side wall outer plate is preferably located below the lower side of the sill outer plate, optionally offset thereto in the vehicle transverse direction. A lower visible edge of the side wall outer plate extending essentially in the sill longitudinal direction can therefore be situated spaced apart from the outer contour of the sill outer plate both in the vehicle vertical direction (z) and also in the vehicle transverse direction (y).

In another embodiment, it is further provided that the side wall outer plate, viewed in a cross-section essentially perpendicular to the sill longitudinal extension, has a side face adjoining its floor section, which extends to the lower side of the sill outer plate and which comes into contact by means of an attachment flange with the lower side of the sill outer plate. The side wall outer plate is preferably fastenable, by means of the attachment flange extending essentially parallel to the lower side of the sill outer plate, to this lower side, in particular by means of common joining techniques, for example, by means of spot welds or laser welds. The side face of the side wall outer plate extends, originating from the floor section, upward and inward in relation to the vehicle geometry, until it presses from below against the sill outer plate using its attachment flange, which is preferably oriented parallel to the sill lower side.

According to a further embodiment, a side wall section, a floor section adjoining thereon, and a side face of the side wall outer plate in turn adjoining thereon form a depression viewed in cross-section in relation to the lower side of the sill outer plate, which is enlarged toward the longitudinal edge of the sill outer plate and/or sill inner plate, i.e., the formation of the lower side wall outer plate attachment on the sill outer plate, which is shortened in cross-section, is not produced over the entire longitudinal extension of sill outer plate and/or side wall outer plate, but rather the side wall outer plate merges toward its longitudinal end into a configuration which is widened in the vehicle transverse direction, and which is essentially based on the shaping of the side wall outer plate known from the prior art.

The side wall outer plate therefore has an essentially unchanged contour on its longitudinal end provided for attachment to further vehicle body components, which allows in particular a terminus part, which is provided for closing the hollow profiles formed by the sill plates and the side wall outer plate, to be transferred in the vehicle transverse direction into the closing position provided for this purpose in the course of an installation process. It is thus provided that the side face provided between floor section and attachment flange of the sill outer plate tapers toward the longitudinal end of the side wall outer plate or, viewed in the profile transverse direction, merges approximately adjoining the connecting flange of sill inner plate and sill outer plate into a floor section free of undercuts, which extends essentially horizontally inward.

It is accordingly provided in a further embodiment that the depression formed by side wall, floor section, and side face optionally widens in the vehicle transverse direction, even with the side face detaching or ending toward the longitudinal end of the sill outer plate and/or sill inner plate. In the longitudinal direction, in particular toward the sill end, the side face can adapt itself either abruptly or continuously to the orientation of the floor section. In particular, the depression, which is exclusively enlarged in the vehicle transverse direction on the sill or outer plate end, forms the lowest-lying area of the side wall outer plate in relation to the vehicle vertical direction.

Therefore, according to another embodiment, at least one recess for receiving a water drain device is implemented in the floor section of the side wall outer plate. The water drain device can be designed in particular as a drain valve, which is manufactured from plastic and is insertable in a formfitting, friction-locked, and/or force-fitted manner into the recess. According to a further embodiment, the side wall outer plate is implemented as a deep-drawn part, which has a receptacle area on its longitudinal end, which is widened in the vehicle transverse direction and/or downward to receive a terminus part, and therefore has a cross-sectional geometry deviating from a middle profile section in this area. Instead of a deep-drawn part made of steel plate, an embossed part can also be used in this case.

According to a further embodiment, the side wall outer plate is welded using its attachment flange, which presses against the lower side of the sill outer plate, to the lower side of the sill outer plate. Furthermore, it is provided that a terminus part which is implemented as a part or as an integral component of a door reinforcement ring structure and has correspondingly predefined geometric dimensions, comes into contact in each case on the interior, on an end section lying in the sill longitudinal direction, adjoining the floor section and/or adjoining the side wall of the side wall outer plate. In particular the floor section of the side wall outer plate, which is free of undercuts and is implemented as essentially level in relation to the vehicle transverse direction (y), allows joining of the sill arrangement to the door reinforcement ring construction having the closure part.

The design of the side wall outer plate, which is at least regionally shortened in cross-section and saves material, therefore has no disadvantageous effects for the vehicle body assembly process and can be incorporated substantially without problems in existing manufacturing processes by replacing the individual part side wall exterior, since the interface of the side wall exterior provided at the profile end is implemented as nearly unchanged in comparison to the prior art and is therefore suitable for receiving a terminus part without restrictions or changes in the manufacturing process. In addition to the described sill arrangement, according to further preferred embodiments, a motor vehicle body and a motor vehicle are also provided, which have at least one of the above-described sill arrangements.

BRIEF DESCRIPTION OF THE FIGURES

The present invention will hereinafter be described in conjunction with the following drawing figures, wherein like numerals denote like elements, and:

FIG. 5 shows a cross-sectional view along section line A-A according to FIG. 3;

FIG. 6 shows a cross-sectional view along C-C according to FIG. 3; and

FIG. 7 shows a sectional view along section line B-B according to FIG. 4.

DETAILED DESCRIPTION

The following detailed description is merely exemplary in nature and is not intended to limit application and uses. Furthermore, there is no intention to be bound by any theory presented in the preceding background or summary or the following detailed description.

Figures 1, 2:
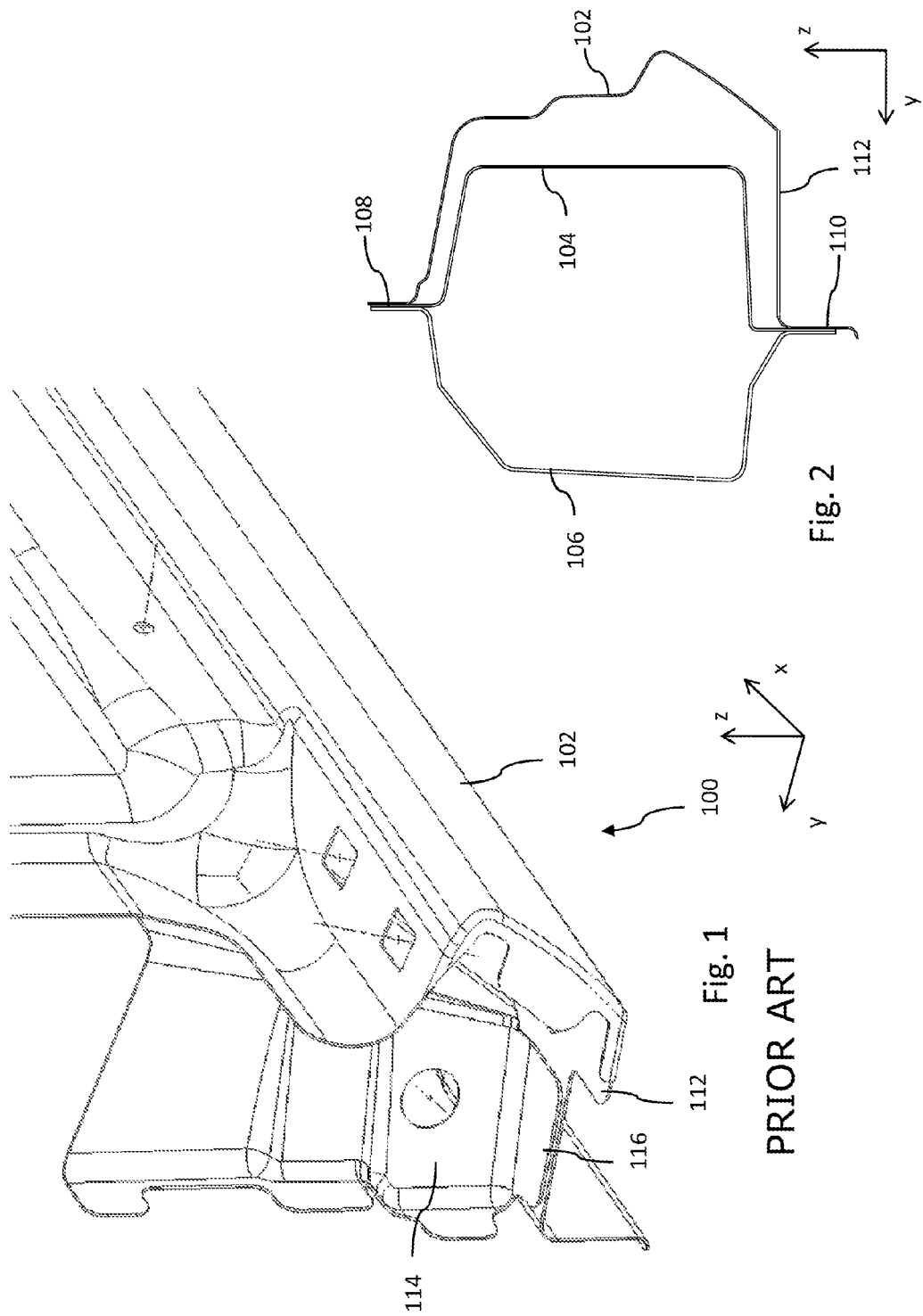
FIG. 1 shows a perspective view of a sill arrangement according to the prior art.
FIG. 2 shows a cross-section through the arrangement according to FIG. 1.
Figure 3:
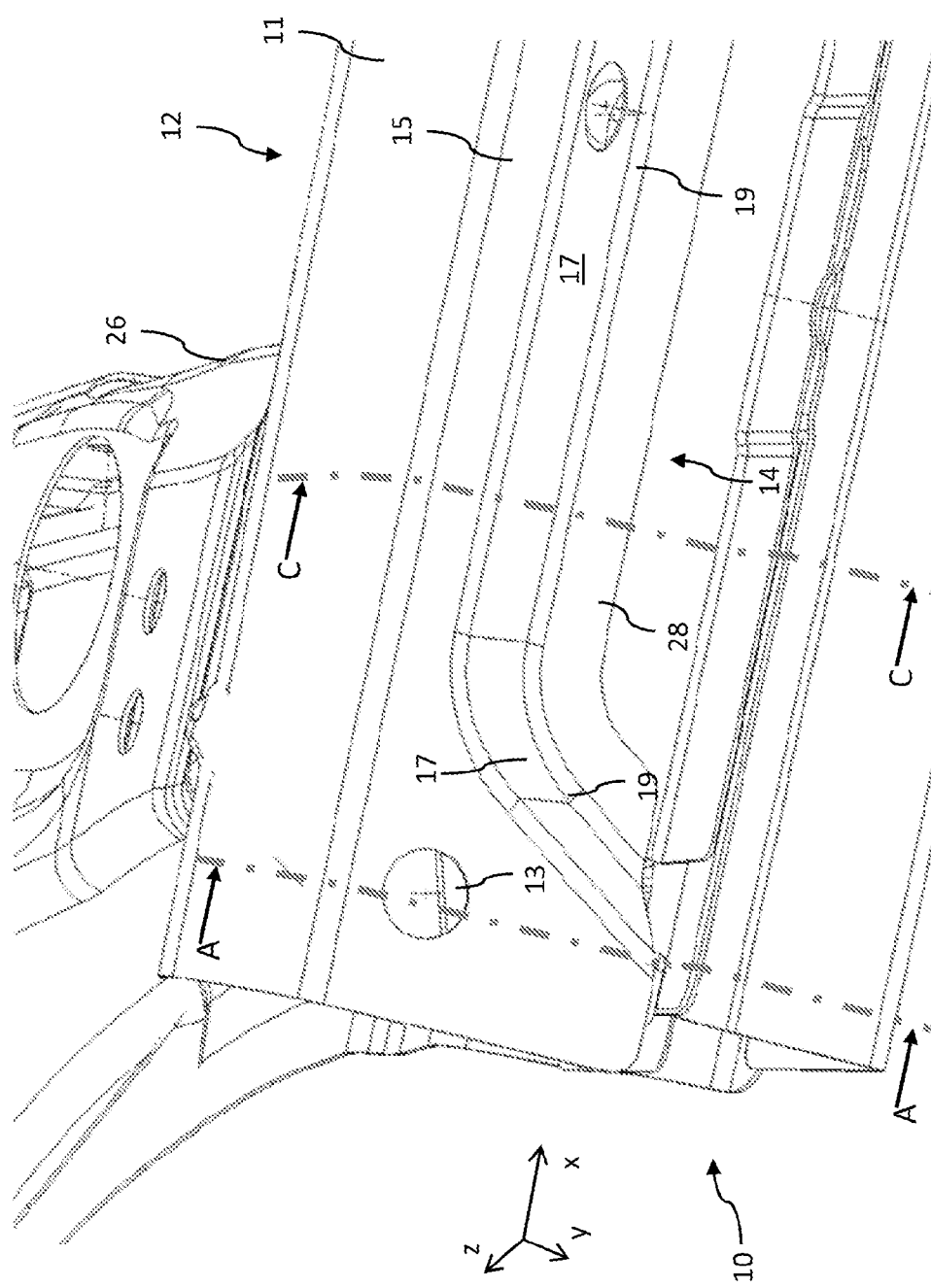
FIG. 3 shows a perspective view of a sill arrangement viewed from below.
Figure 4:
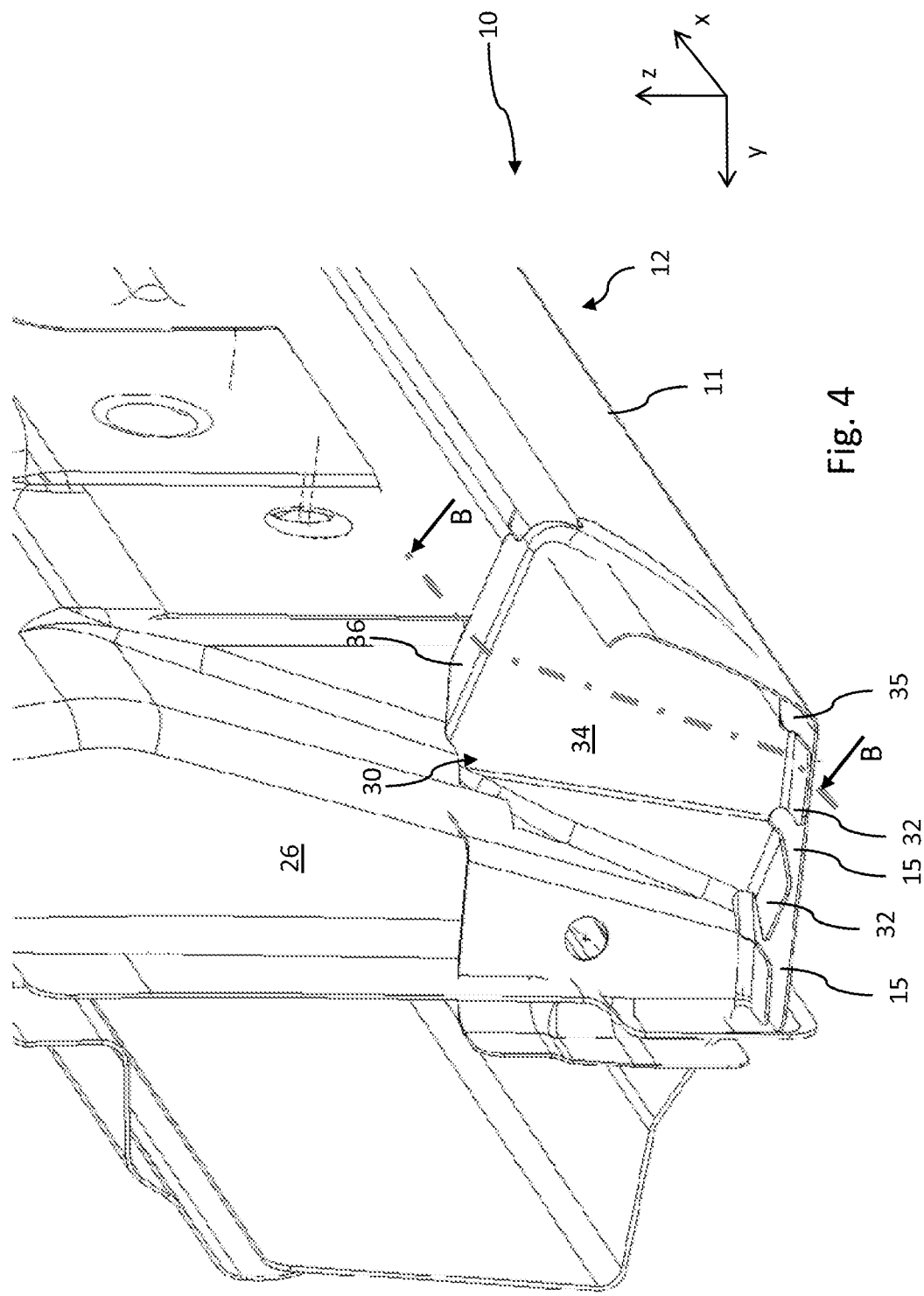
FIG. 4 shows a further perspective view of the sill arrangement according to FIG. 3 viewed diagonally from the front.

A sill arrangement 10 is shown in the perspective views according to FIGS. 3 and 4, which is at least regionally paneled to the outside by a side wall outer plate 12. The sill structure formed by sill inner plate 16 and sill outer plate 14 is shown separately in cross-section C-C in FIG. 6. The two half-shells 16, 14 forming the side sill are each provided on the top and bottom with attachment flanges, which each press against one another to form an upper joint and a lower joint 18, 20.

As shown in FIG. 3 and FIG. 6, the side wall outer plate 12 has a side wall 11, which merges downward in the z direction into a floor section 15. Originating from the lowest point of the floor section 15 or area, a side face 17 extends inward and upward, which finally comes into contact using an attachment flange 19 on a lower side 28 of an essentially horizontally running cross profile section of the sill outer plate 14 and is connected thereto to form a joint there. A welded connection, in particular a spot weld or laser weld, preferably comes into consideration for this purpose. In the floor section 15, which tapers approximately to a point downward, shown in FIG. 6, the side wall outer plate 12 forms a visible edge predefined in accordance with the design requirements.

On the interior, the side wall 11, the floor section 15, and the side face 17 form a depression 38, which, viewed in the vehicle transverse direction (y), forms an undercut, which could not be closed using a terminus part 30 to be inserted in the vehicle transverse direction (y) in the further progress of the vehicle body assembly. For this reason, the side wall outer plate 12 has a discontinuous cross-sectional profile viewed in the profile longitudinal direction. While it is implemented as quasi-shortened in the vehicle transverse direction (y) in the cross-section according to FIG. 6 and adjoins the sill lower side 28, the cross-sectional profile merges toward the profile end into a shape shown in FIG. 5 in cross-section A-A. In comparison to the cross-sectional profile according to FIG. 6, the side face 17 no longer runs inward and upward, but rather extends essentially parallel to the floor section 28 of the sill outer plate 14, more or less in linear extension of the apex of the floor section 15 in the direction toward the flange section 20 of sill outer plate 14 and sill inner plate 16.

In the cross-sectional view according to FIG. 5, the sill outer plate 14 is no longer explicitly shown, since it is implemented as shorter in the sill longitudinal direction (x) than the sill inner plate 16 shown and the side wall outer plate 12. In the cross-section according to FIG. 5, the attachment of the terminus part 30, which is shown in perspective in FIG. 4, to the side wall outer plate 12, is also shown. The terminus part 30 has a front face 34, which essentially closes the hollow profile formed by sill inner plate 16, sill outer plate 14, and side wall outer plate 12.

For fastening on the inner side of the side wall outer plate 12, the terminus part 30 further has fastening flanges 32 oriented in the vehicle longitudinal direction (x), which are supported on the inner side of the floor section 15 of the side wall outer plate 12. Toward the side wall 11 of the side wall outer plate 12, the terminus part 30 has a set-back tab 35 which protrudes upward in cross-section. In the cross-section shown in FIG. 5, the sill inner plate 16 further adjoins a lateral front wall plate 42 on top.

The cross-section of FIG. 7 along section line B-B further shows a drain valve 46 inserted into the floor section 15 of the side wall outer plate 12, which is to be inserted into the recess 13, shown in the top view in FIG. 3, of the floor section 15 of the side wall outer plate 12, which is implemented as widened in the vehicle transverse direction (y). As is recognizable in FIG. 7, the drain valve 46 is situated at the lowest possible point of the floor section 15, so that any possibly occurring condensed water can drain out due to gravity. Furthermore, the terminus part 30 is shown in cross-section in FIG. 7, which is supported using a lower attachment flange 32 on the upper side of the floor section 15 of the side wall outer plate 12 and is attachable using an upper attachment flange 36 on a further vehicle body component, for example, on an upper wall section of the sill inner plate 16 and/or the sill outer plate 14. Furthermore, FIG. 3, FIG. 4, and FIG. 7 show a hinge column 26, which forms an extension of an A-column of the motor vehicle body, for example. In addition, a reinforcement plate 44 is shown in FIG. 5, which reinforces the area of a vehicle jack receptacle in the connecting flange 20 of the side sill structure.

The illustrated embodiments merely show possible embodiments, for which numerous further variants are conceivable. The exemplary embodiments shown as examples are in no way to be understood as restrictive with respect to the extent, the applicability, or the possible configurations. The present summary and description merely shows one possible implementation of embodiments to a person skilled in the art. Greatly varying modifications can thus be performed on the function and arrangement of described elements, without leaving the scope of protection defined by the following patent claims or equivalents thereof.

What is claimed is:

1. A sill arrangement of a body for a motor vehicle, comprising:
   a sill outer plate having a first longitudinal length;
   a sill inner plate having a second longitudinal length;
   a flange configured to connect the sill inner plate and the sill outer plate, the flange extending essentially in a sill longitudinal direction; and
   a side wall outer plate is at least regionally fastened to a lower side of the sill outer plate at a distance from the flange, the side wall outer plate having a third longitudinal length, wherein the third longitudinal length and the second longitudinal length are longer than the first longitudinal length such that the flange and the sill outer plate terminate in the sill longitudinal direction at a position less than that of the sill inner plate and side outer wall plate, and
   wherein the side wall outer plate includes a depression portion and a flattened portion extending from the depression portion in a forward longitudinal direction to receive a terminus part,
   wherein the side wall outer plate includes a side wall, a floor section, and a side face, and wherein the floor section forms a V-shaped undercut in the depression portion that transitions into a generally flat base in the flattened portion.

2. The sill arrangement according to claim 1, wherein the floor section comes to rest at a predefined distance from the lower side of the sill outer plate in relation to a vehicle vertical direction.

3. The sill arrangement according to claim 2, wherein the side face extends to the lower side of the sill outer plate and contacts the lower side with an attachment flange.

4. The sill arrangement according to claim 1, wherein the depression widens in vehicle transverse direction toward the longitudinal end of the sill inner plate.

5. The sill arrangement according to claim 1, wherein the side wall outer plate comprises a recess configured to receive a water drain device in a floor section.

6. The sill arrangement according to claim 3, wherein the side wall outer plate is welded using the attachment flange to the lower side of the sill outer plate.

7. The sill arrangement according to claim 2, further comprising the terminus part comprising predefined geometric dimensions that contacts at an end section located in the sill longitudinal direction adjoining the floor section.

8. The sill arrangement according to claim 1, further comprising the terminus part comprising predefined geometric dimensions that contacts at an end section located in the sill longitudinal direction adjoining the side wall.

9. The sill arrangement of claim 1,
   wherein the side wall outer plate is a deep-drawn part.

\* \* \* \* \*